United States Patent
Goslin

(10) Patent No.: US 10,589,625 B1
(45) Date of Patent: Mar. 17, 2020

(54) SYSTEMS AND METHODS FOR AUGMENTING AN APPEARANCE OF AN ACTUAL VEHICLE COMPONENT WITH A VIRTUAL VEHICLE COMPONENT

(71) Applicant: Disney Enterprises, Inc., Burbank, CA (US)

(72) Inventor: Michael P. Goslin, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/966,754

(22) Filed: Dec. 11, 2015

(51) Int. Cl.
*B60K 35/00* (2006.01)

(52) U.S. Cl.
CPC .......... *B60K 35/00* (2013.01); *B60K 2370/31* (2019.05)

(58) Field of Classification Search
CPC .................. B60K 35/00; B60K 2350/2065
See application file for complete search history.

(56) References Cited

U.S. PATENT DOCUMENTS

| | | |
|---|---|---|
| 1,004,331 A | 9/1911 | Wright |
| 1,004,624 A | 10/1911 | Brann |
| 6,053,815 A | 4/2000 | Hara |
| 6,200,138 B1 | 3/2001 | Ando |
| 6,691,032 B1 | 2/2004 | Irish |
| 7,837,544 B2 | 11/2010 | Tipping |
| 8,190,295 B1 | 5/2012 | Garretson |
| 8,758,126 B2 | 6/2014 | Bavitz |
| 8,941,690 B2 | 1/2015 | Seder |
| 8,988,465 B2 * | 3/2015 | Baron ............... G06T 19/006 345/632 |
| 9,007,400 B2 * | 4/2015 | Takahashi ............ G06T 11/00 345/633 |
| 9,266,018 B2 | 2/2016 | Story |
| 9,293,042 B1 | 3/2016 | Wasserman |

(Continued)

FOREIGN PATENT DOCUMENTS

WO    2018128946 A1    7/2018

OTHER PUBLICATIONS

Adam Hartley, 5 Predictions for the Future of in-Car Entertainment, Apr. 9, 2019 [https://360.here.com/5-predictions-for-the-future-of-in-car-leisure-entertainment], (5 pages).

(Continued)

*Primary Examiner* — Hunter B Lonsberry
*Assistant Examiner* — Mathew Franklin Gordon
(74) *Attorney, Agent, or Firm* — Esplin & Associates, PC

(57) ABSTRACT

This disclosure relates to systems and methods for augmenting an appearance of an actual vehicle component of an actual vehicle with a virtual vehicle component. An actual vehicle component may be augmented with a virtual vehicle component by obtaining a vehicle type of the actual vehicle, detecting a landmark associated with the actual vehicle, determining a position and an orientation of the landmark, selecting a virtual vehicle component, placing the virtual vehicle component within an overlay image, where the position and the orientation of the virtual vehicle component is based on the position and the orientation of the landmark, and displaying the overlay image so that one or more portions of the virtual vehicle component appear to cover one or more portions of the actual vehicle component.

23 Claims, 9 Drawing Sheets

(56) References Cited

U.S. PATENT DOCUMENTS

| | | |
|---|---|---|
| 9,327,189 B2 | 5/2016 | Bavitz |
| 9,361,730 B2 | 6/2016 | Keating |
| 9,610,510 B2 | 4/2017 | Comploi |
| 9,643,086 B2 | 5/2017 | Tipping |
| 9,669,302 B2 | 6/2017 | Park |
| 9,715,764 B2 | 7/2017 | Alaniz |
| 9,744,448 B2 | 8/2017 | Mullen |
| 9,814,991 B2 | 11/2017 | Van Winkle |
| 9,821,920 B2 | 11/2017 | Cole |
| 9,922,466 B2 | 3/2018 | Donnelly |
| 10,019,070 B2 | 7/2018 | Szczerba |
| 10,025,431 B2 | 7/2018 | Li |
| 10,059,347 B2 | 8/2018 | Thieberger-Navon |
| 10,140,464 B2 | 11/2018 | Lebeck |
| 10,162,998 B2 | 12/2018 | Park |
| 10,310,600 B2 | 6/2019 | Hong |
| 10,339,711 B2 | 7/2019 | Ng-Thow-Hing |
| 10,366,290 B2 | 7/2019 | Wang |
| 2003/0130031 A1 | 7/2003 | Yoshida |
| 2008/0311983 A1 | 12/2008 | Koempel |
| 2009/0079705 A1 | 3/2009 | Sizelove |
| 2010/0130296 A1 | 5/2010 | Ackley |
| 2010/0182340 A1 | 7/2010 | Bachelder |
| 2010/0331721 A1 | 12/2010 | Epley |
| 2011/0216948 A1 | 9/2011 | Yalla |
| 2012/0089275 A1 | 4/2012 | Yao-Chang |
| 2012/0142415 A1 | 6/2012 | Lindsay |
| 2012/0256945 A1 | 10/2012 | Kidron |
| 2012/0264518 A1 | 10/2012 | Rouille |
| 2013/0083003 A1 | 4/2013 | Perez |
| 2013/0083061 A1 | 4/2013 | Mishra |
| 2013/0166147 A1 | 6/2013 | Chudzinski |
| 2013/0274024 A1 | 10/2013 | Geylik |
| 2014/0067208 A1 | 3/2014 | Klappert |
| 2014/0128144 A1 | 5/2014 | Bavitz |
| 2014/0128145 A1 | 5/2014 | Hwang |
| 2014/0295963 A1 | 10/2014 | Ishikawa |
| 2014/0342790 A1 | 11/2014 | Kim |
| 2015/0065237 A1 | 3/2015 | Hohn |
| 2015/0097864 A1 | 4/2015 | Alaniz |
| 2015/0202962 A1* | 7/2015 | Habashima ............ B60K 35/00 345/633 |
| 2015/0294505 A1 | 10/2015 | Atsmon |
| 2015/0346722 A1 | 12/2015 | Herz |
| 2016/0096114 A1 | 4/2016 | Van Winkle |
| 2016/0199730 A1 | 7/2016 | Olson |
| 2016/0206955 A1 | 7/2016 | Goslin |
| 2016/0206957 A1 | 7/2016 | Goslin |
| 2016/0299567 A1* | 10/2016 | Crisler ............... H04N 13/0422 |
| 2016/0313792 A1 | 10/2016 | Siegel |
| 2016/0346704 A1 | 12/2016 | Wagner |
| 2017/0021273 A1 | 1/2017 | Rios |
| 2017/0021282 A1 | 1/2017 | Comploi |
| 2017/0045946 A1 | 2/2017 | Smoot |
| 2017/0050743 A1* | 2/2017 | Cole .................... B64D 43/00 |
| 2017/0068311 A1 | 3/2017 | Evans |
| 2017/0072316 A1 | 3/2017 | Finfter |
| 2017/0103571 A1 | 4/2017 | Beaurepaire |
| 2017/0132334 A1 | 5/2017 | Levinson |
| 2017/0166221 A1 | 6/2017 | Osterman |
| 2017/0330034 A1 | 11/2017 | Wang |
| 2018/0040162 A1 | 2/2018 | Donnelly |
| 2018/0040163 A1 | 2/2018 | Donnelly |
| 2018/0043272 A1 | 2/2018 | Van Winkle |
| 2018/0089901 A1 | 3/2018 | Rober |
| 2018/0231973 A1 | 8/2018 | Mattingly |
| 2019/0065970 A1 | 2/2019 | Bonutti |
| 2019/0101976 A1 | 4/2019 | Reichow |
| 2019/0220674 A1 | 7/2019 | Khalfan |

OTHER PUBLICATIONS

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).
Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

* cited by examiner

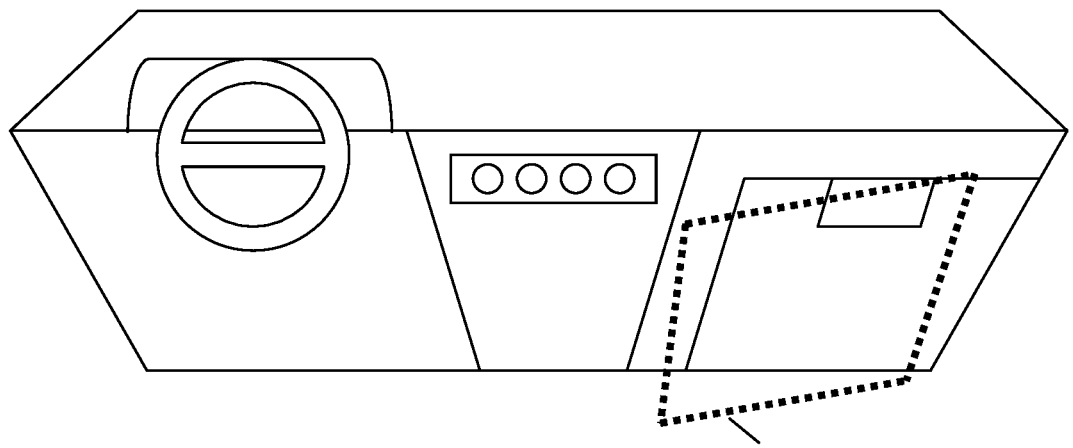
FIG. 7A  glove compartment detection 71
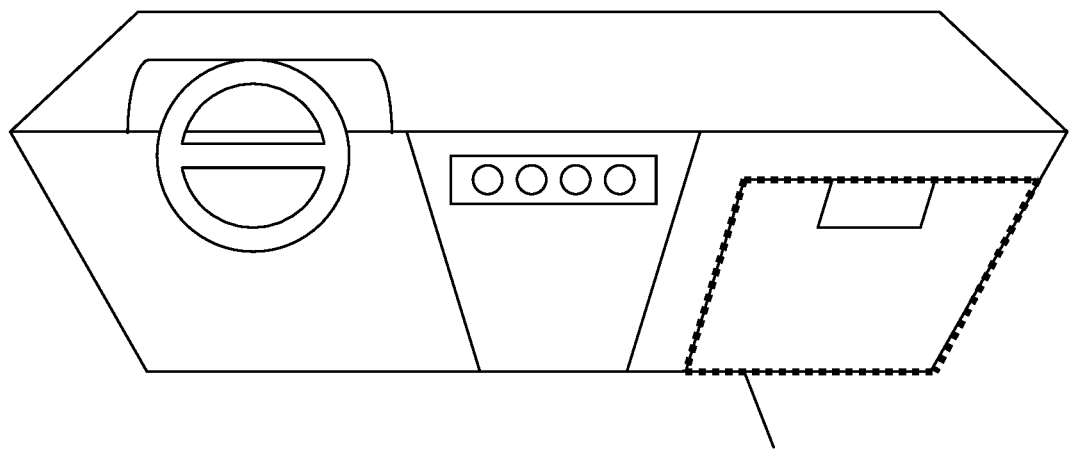
FIG. 7B  changed glove compartment detection 72

SYSTEMS AND METHODS FOR AUGMENTING AN APPEARANCE OF AN ACTUAL VEHICLE COMPONENT WITH A VIRTUAL VEHICLE COMPONENT

FIELD

This disclosure relates to systems and methods for augmenting an appearance of an actual vehicle component with a virtual vehicle component.

BACKGROUND

Vehicle entertainment systems allow a person to use a display of a vehicle to play movies and/or games. Such vehicle entertainment systems do not allow a person to view actual vehicle components augmented by virtual vehicle components.

SUMMARY

This disclosure relates to augmenting an appearance of an actual vehicle component of an actual vehicle with a virtual vehicle component. An actual vehicle component may be augmented with a virtual vehicle component by obtaining a vehicle type of the actual vehicle, detecting a landmark associated with the actual vehicle, determining a position and an orientation of the landmark, selecting a virtual vehicle component, placing the virtual vehicle component within an overlay image, where the position and the orientation of the virtual vehicle component is based on the position and the orientation of the landmark, and displaying the overlay image so that one or more portions of the virtual vehicle component appear to cover one or more portions of the actual vehicle component.

A system configured to augment an appearance of an actual vehicle component of an actual vehicle with a virtual vehicle component may include an image sensor, a display, one or more processors and/or other components. In some implementations, the image sensor and the one or more processors may be carried on the display, and the field of view of the image sensor may be a function of the position and the orientation of the display.

The image sensor may be configured to generate output signals conveying visual information within the field of view of the image sensor. The image sensor may include one or more of a charge-coupled device sensor, an active pixel sensor, a complementary metal-oxide semiconductor sensor, an N-type metal-oxide-semiconductor sensor, and/or other image sensors.

The display may be configured to display an overlay image. In some implementations, the display may include one or more of a head-mounted display, an optical head-mounted display, a see-through display, an optical see-through display, a video see-through display, a visor, eyeglasses, sunglasses, a smartphone, a tablet, a mobile device, a projector, and/or other displays.

The one or more processors may be configured to obtain a vehicle type of the actual vehicle. A vehicle type may include a make, a model, a year, shape, size, color, and/or other vehicle types. A vehicle type may be obtained based on one or more user inputs received through one or more input devices.

The one or more processors may be configured to detect a landmark associated with the actual vehicle. The landmark may indicate a reference point for the actual vehicle that facilitates determination of the position and the orientation of an actual vehicle component. In some implementations, the landmark may include one or more of an augmented reality marker, an actual vehicle component, another actual vehicle component of the actual vehicle, and/or other landmarks. The landmark may be within the field of view of the image sensor. In some implementations, the one or more processor may be configured to change the detection of the landmark based on one or more user inputs received through one or more input devices.

The one or more processors may be configured to determine a position and an orientation of the landmark. In some implementations, the one or more processors may be configured to change one or both of the determined position and/or the determined orientation of the landmark based on one or more user inputs received through one or more input devices.

The one or more processors may be configured to select a virtual vehicle component. In some implementations, the one or more processors may be configured to change the selection of the virtual component based on one or more user inputs received through one or more input devices.

The one or more processors may be configured to determine a position and an orientation of the virtual vehicle component based on the determined position and the determined orientation of the landmark. In some implementations, the one or more processors may be configured to change one or both of the determined position and/or the determined orientation of the virtual vehicle component based on one or more user inputs received through one or more input devices.

The one or more processors may be configured to determine an overlay image. The overlay image may include a virtual vehicle component. The virtual vehicle component may be placed within the overlay image according to the determined position and the determined orientation of the virtual vehicle component.

The one or more processors may be configured to effectuate displaying of an overlay image on a display. The displaying may be effectuated so that one or more portions of the virtual vehicle component may appear to cover one or more portions of the actual vehicle component and augment the appearance of the actual vehicle component.

In some implementations, the actual vehicle component may include one or more of an interior of the actual vehicle, an exterior of the actual vehicle, a seat, a headrest, a dash, a dashboard, a steering wheel, a gearstick, a gear knob, a glove compartment, a floorpan, a mat, an air vent, a navigation system, an entertainment system, a ceiling, an interior light, a moon roof, a tilt roof, a windshield, a side window, a rear window, a rear view mirror, a side view mirror, an arm rest, a front center console, a rear center console, a logo, a door, a door handle, a hood, a grille, a bumper, a fender, a headlight, a tail light, a wheel, a hubcap, a trunk lid, a tailgate, a roof, a side panel, a trailer, and/or another actual vehicle component of the actual vehicle.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 7A illustrates a detection of a glove compartment in accordance with one or more implementations.

FIG. 7B illustrates changes to a detection of a glove compartment in accordance with one or more implementations.

DETAILED DESCRIPTION

Figure 1:
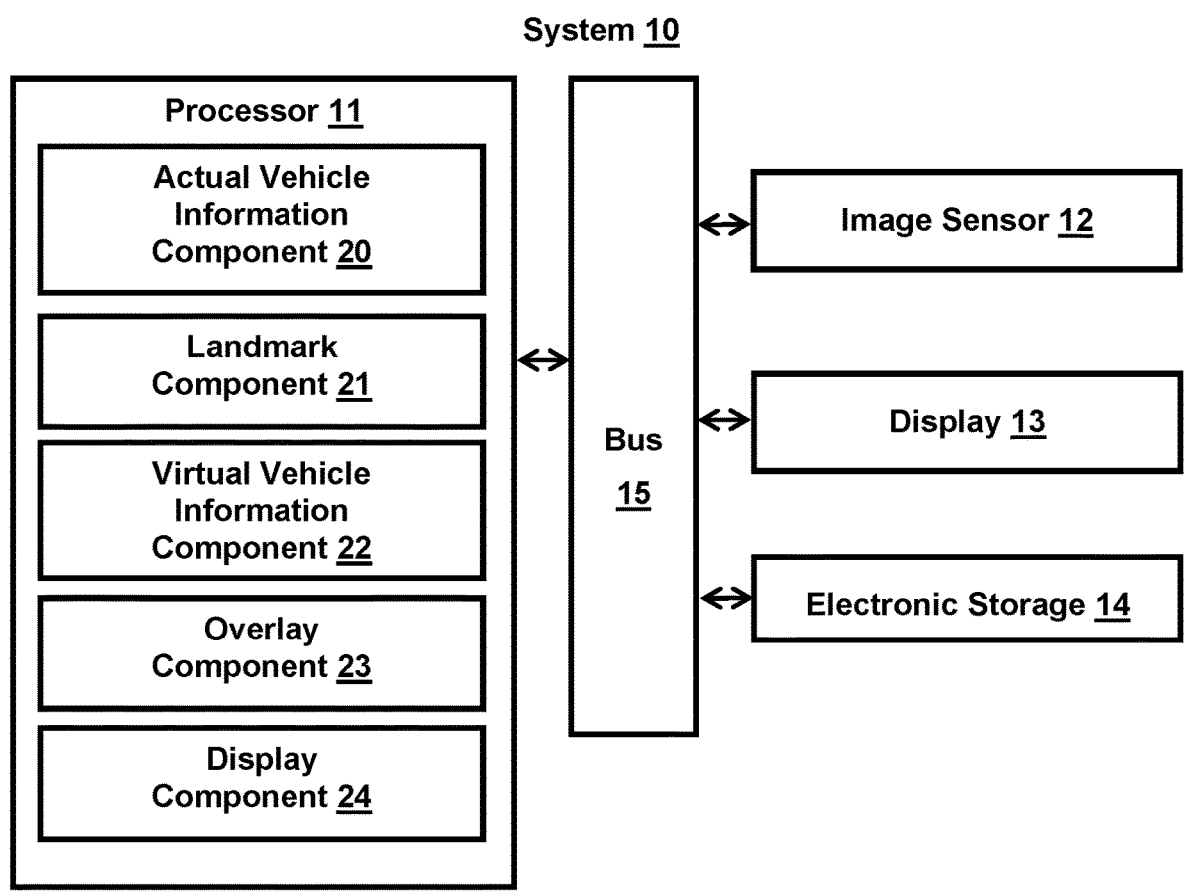
FIG. 1 illustrates a system configured to augment an appearance of an actual vehicle component of an actual vehicle with a virtual vehicle component.

FIG. 1 illustrates a system 10 configured to augment an appearance of an actual vehicle component of an actual vehicle with a virtual vehicle component. System 10 may include one or more of processor 11, image sensor 12, display 13, electronic storage 14, bus 15, and/or other components. To augment an actual vehicle component, a vehicle type of the actual vehicle may be obtained. A landmark may be detected, and the position and the orientation of the landmark may be determined. The landmark may indicate a reference point for the actual vehicle that facilitates determination of the position and the orientation of an actual vehicle component. A virtual vehicle component may be selected and placed within an overlay image based on the position and the orientation of the landmark. The overlay image may be displayed so that one or more portions of the virtual vehicle component appear to cover one or more portions of the actual vehicle component.

An actual vehicle component may refer to one or more parts of a real vehicle. A real vehicle may refer to a vehicle that actually exists. A part of a real vehicle may refer to a single piece of a real vehicle or multiple pieces of a real vehicle that make up one or more sections of the real vehicle. A part of a real vehicle may be fixed or movable. A part of a real vehicle may be installed in the real vehicle at the time of manufacture or installed after the time of manufacture. By way of non-limiting example, an actual vehicle component may include one or more of an interior of the actual vehicle, an exterior of the actual vehicle, a seat, a headrest, a dash, a dashboard, a steering wheel, a gearstick, a gear knob, a glove compartment, a floorpan, a mat, an air vent, a navigation system, an entertainment system, a ceiling, an interior light, a moon roof, a tilt roof, a windshield, a side window, a rear window, a rear view mirror, a side view mirror, an arm rest, a front center console, a rear center console, a logo, a door, a door handle, a hood, a grille, a bumper, a fender, a headlight, a tail light, a wheel, a hubcap, a trunk lid, a tailgate, a roof, a side panel, a trailer, and/or another actual vehicle component of the actual vehicle.

A virtual vehicle component may refer to one or more parts of a virtual vehicle. A virtual vehicle may refer to a vehicle that actually exists or a vehicle that does not actually exist. For example, a virtual vehicle may include an X-Wing in the Star Wars universe. As another example, a virtual vehicle may include a real vehicle. A part of a virtual vehicle may refer to a single piece of a virtual vehicle or multiple pieces of a virtual vehicle that make up one or more sections of the virtual vehicle. By way of non-limiting example, a virtual vehicle component of an X-Wing may include one or more of an interior of an X-Wing, an exterior of an X-Wing, a flight control of an X-Wing, a weapons control of an X-Wing, a wing of an X-Wing, a seat of an X-Wing, an engine of an X-Wing, and/or other virtual vehicle components of the X-Wing. A virtual vehicle component may be static or dynamic. For example, a virtual vehicle component may include a wing of an X-Wing that does not change. As another example, a virtual vehicle component may include a navigation console of an X-Wing that changes (for example, a radar, a fuel gauge, a speedometer, an odometer, a clock, etc.). Other types of virtual vehicles and virtual vehicle components are contemplated.

Image sensor 12 may be configured to generate output signals conveying visual information within the field of view of image sensor 12. Visual information may include one or more of an image, a video, and/or other visual information. When a landmark is within the field of view of image sensor 12, visual information may include one or more of an image, a video, and/or other visual information regarding the landmark. Image sensor 12 may include one or more of a charge-coupled device sensor, an active pixel sensor, a complementary metal-oxide semiconductor sensor, an N-type metal-oxide-semiconductor sensor, and/or other image sensors.

Display 13 may be configured to display an overlay image. In some implementations, display 13 may include one or more of a head-mounted display, an optical head-mounted display, a see-through display, an optical see-through display, a video see-through display, a visor, eye-glasses, sunglasses, a smartphone, a tablet, a mobile device, a projector, and/or other displays. In some implementations, processor 11 and image sensor 12 may be carried on display 13, and the field of view of image sensor 12 may be a function of the position and the orientation of display 13.

Electronic storage 14 may include electronic storage media that electronically stores information. Electronic storage 14 may store software algorithms, information determined by processor 11, information received remotely, and/or other information that enables system 10 to function properly. For example, electronic storage 14 may store visual information (as discussed elsewhere herein), information relating to actual vehicles, information relating to actual vehicle components, information relating to virtual vehicles, information relating to virtual vehicle components, information relating to landmarks, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more computer program components. The computer program components may include one or more of actual vehicle information component 20, landmark component 21, virtual vehicle information component 22, overlay component 23, display component 24, and/or other components.

Actual vehicle information component 20 may be configured to obtain a vehicle type of the actual vehicle. A vehicle type may include a make, a model, a year, shape, size, color, and/or other vehicle types. A vehicle type may be obtained based on one or more user inputs received through one or more input devices. By way of non-limiting example, an input device may include one or more of a key entry device, a touch entry device, an imaging device, a sound device, and/or other input devices. A user input may refer to one or more information provided by a user through an input device.

A key entry device may include a device that allows a user to provide one or more user inputs by typing one or more of characters, numbers, and/or other symbols. A key entry device may include a separate device or a part of another device. For example, a key entry device may include a keyboard coupled to processor 11. As another example, a key entry device may include a mobile device coupled to processor 11. A user may provide one or more user inputs by typing one or more information. For example, a user may provide one or more user inputs by typing one or more of a make, a model, a year, shape, size, color, and/or other information about the actual vehicle.

A touch entry device may include a device that allows a user to provide user inputs by touching a user interface of the touch entry device. A touch entry device may include a separate device or a part of another device. For example, a touch entry device may include a touch screen coupled to processor 11. As another example, a touch entry device may include a mobile device coupled to processor 11. A user may provide one or more user inputs by touching one or more portions of the touch entry device corresponding to one or more information. For example, a user may provide one or more user inputs by touching one or more portions of the touch entry device corresponding to one or more of a make, a model, a year, shape, size, color, and/or other information about the actual vehicle An imaging device may include a device that allows a user to provide user inputs by using an image sensor of the imaging device. An imaging device may include a separate device or a part of another device. For example, an imaging device may include an image sensor coupled to processor 11. As a non-limiting example, an imaging device may include image sensor 12. As another example, an imaging device may include a mobile device coupled to processor 11. A user may provide one or more user inputs by directing the field of view of the imaging device to objects that include information. For example, a user may provide one or more user inputs by directing the field of view of the imaging device to a vehicle identification number (VIN) of the actual vehicle, an exterior of the actual vehicle, an interior of the actual vehicle, a logo of the actual vehicle, an actual vehicle component, a landmark, and/or other objects that include information about the actual vehicle.

A sound device may include a device that allows a user to provide user inputs through voice and/or sounds. A sound device may include a separate device or part of another device. For example, a sound device may include a microphone coupled to processor 11. As another example, a sound device may include a mobile device coupled to processor 11. A user may provide one or more user input by speaking one or more information. For example, a user may provide one or more user inputs by speaking one or more of a make, a model, a year, shape, size, color, and/or other information about the actual vehicle.

Landmark component 21 may be configured to detect a landmark associated with the actual vehicle. A landmark may be detected based on output signals conveying visual information within the field of view of image sensor 12. In some implementations, a landmark may include one or more of an augmented reality (AR) marker, an actual vehicle component, another actual vehicle component of the actual vehicle, and/or other landmarks.

An augmented reality marker may refer to a maker containing information regarding the actual vehicle. An augmented reality marker may be two-dimensional or three-dimensional. As a non-limiting example, an augmented reality marker may include one or more of a sticker, a label, a barcode, a quick response (QR) code, and/or other augmented reality marker. An augmented reality marker may be placed on the actual vehicle component or near the actual vehicle component.

An actual vehicle component may refer to an actual vehicle component that will be augmented by a virtual vehicle component. For example, an actual vehicle component to be augmented by a virtual vehicle component may be a glove compartment of an actual vehicle, and a landmark may include the glove compartment.

Another actual vehicle component of the actual vehicle may refer to an actual vehicle component that will not be augmented by a virtual vehicle component. For example, an actual vehicle component to be augmented by a virtual vehicle component may be a glove compartment of the actual vehicle, and an landmark may include a dash or a portion of a dash of the actual vehicle.

Figure 3:
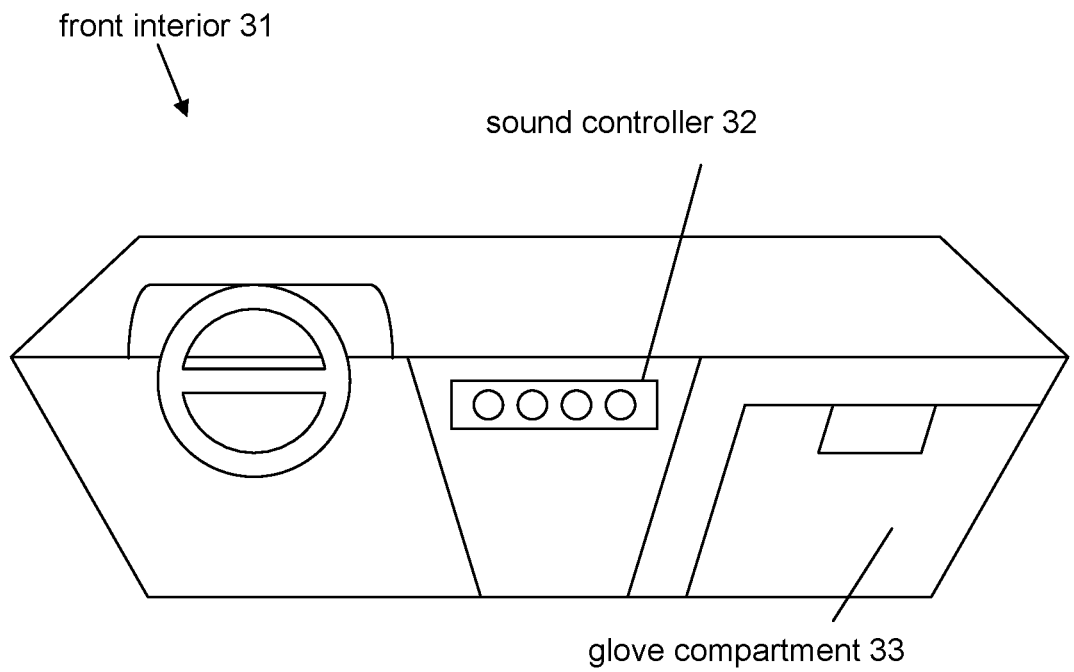
FIG. 3 illustrates a front interior of an actual vehicle.

The landmark may indicate a reference point for the actual vehicle that facilitates determination of the position and the orientation (yaw, pitch, and/or roll) of an actual vehicle component. Landmark component 21 may include or retrieve information (for example a database, etc.) that matches a detected landmark to a position and an orientation of an actual vehicle component. For example, a landmark may include a sound controller of an actual vehicle and an actual vehicle component to be augmented may include a glove compartment of the actual vehicle. FIG. 3 illustrates front interior 31 of an actual vehicle. Front interior 31 includes sounds controller 32, glove compartment 33, and other actual vehicle components. Landmark component 21 may detect sound controller 32 and find information in the database that indicates the position and the orientation of glove compartment 33 with respect to sound controller 32.

As another example, a landmark may include a sound controller of an actual vehicle and an actual vehicle component to be augmented may include an interior of the actual vehicle. For example, in FIG. 3, landmark component 21 may detect sound controller 32 and find information in the database that indicates the position and the orientation of front interior 31 of the actual vehicle, including glove compartment 33 and other actual vehicle components, with respect to sound controller 32.

Figure 4:
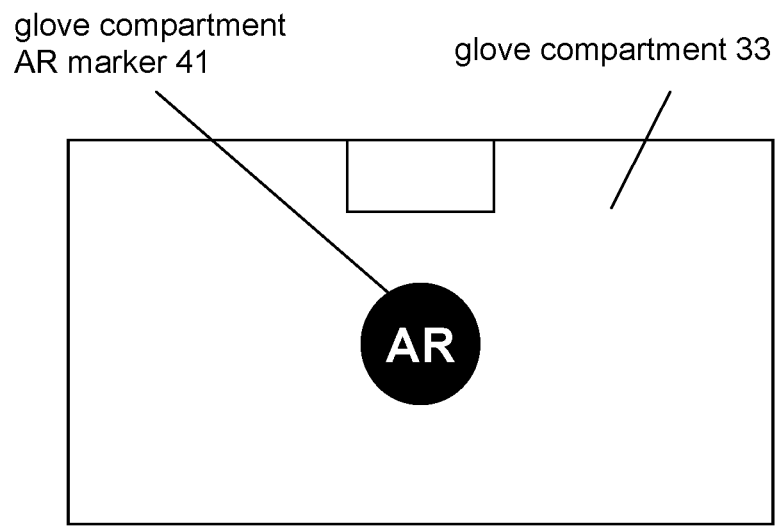
FIG. 4 illustrates an AR marker placed on a glove compartment of an actual vehicle.

As another example, a landmark may include an augmented reality marker indicating a position of a glove compartment. FIG. 4 illustrates glove compartment 33 of an actual vehicle. Positioned in the center of glove compartment 33 is glove compartment AR marker 41. Landmark component 21 may detect glove compartment AR marker 41 and find information in the database that indicates the position and the orientation of glove compartment 33 with respect to glove compartment AR marker 41. While glove compartment AR marker 41 is shown to be position in the center of glove compartment 33 in FIG. 4, this is not intended to be limiting. Glove compartment AR marker 41 may be placed on other part of glove compartment 33 or other part of the actual vehicle.

Figure 5:
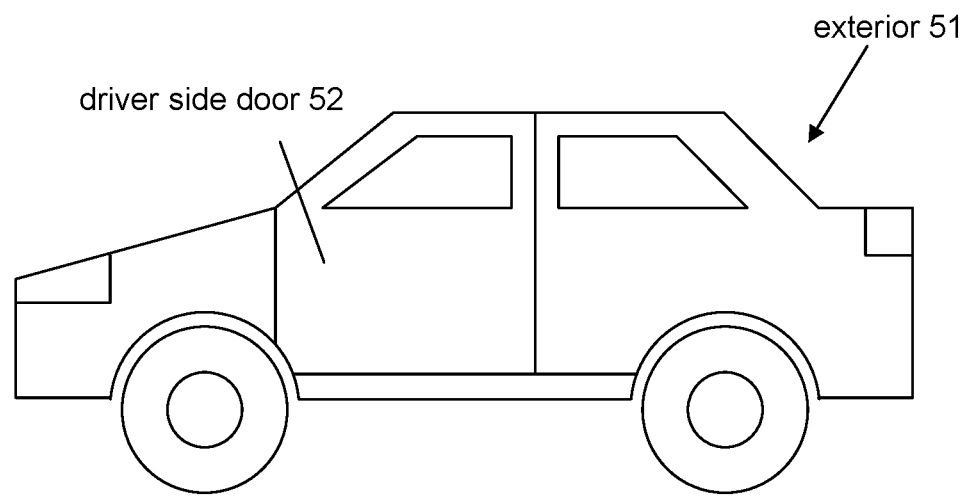
FIG. 5 illustrates a side view of an exterior of an actual vehicle.

As another example, a landmark may include a driver side door of an actual vehicle and an actual vehicle component to be augmented may include an exterior of the actual vehicle. FIG. 5 illustrates a side view of exterior 51 of an actual vehicle. Side view of exterior 52 includes a view of driver side door 52. Landmark component 21 may detect driver side door 52 and find information in the database that indicates the position and the orientation of exterior 52 of the actual vehicle with respect to driver side door 52.

In some implementations, landmark component 21 may be configured to change the detection of a landmark based on one or more user inputs received through one or more input devices. By way of non-limiting example, an input device may include one or more of a key entry device, a touch entry device, a sound device, and/or other input devices, as described above. A user input may refer to one or more information provided by a user through an input device, as described above. A user input may include one or more information relating to the landmark.

Figure 6:
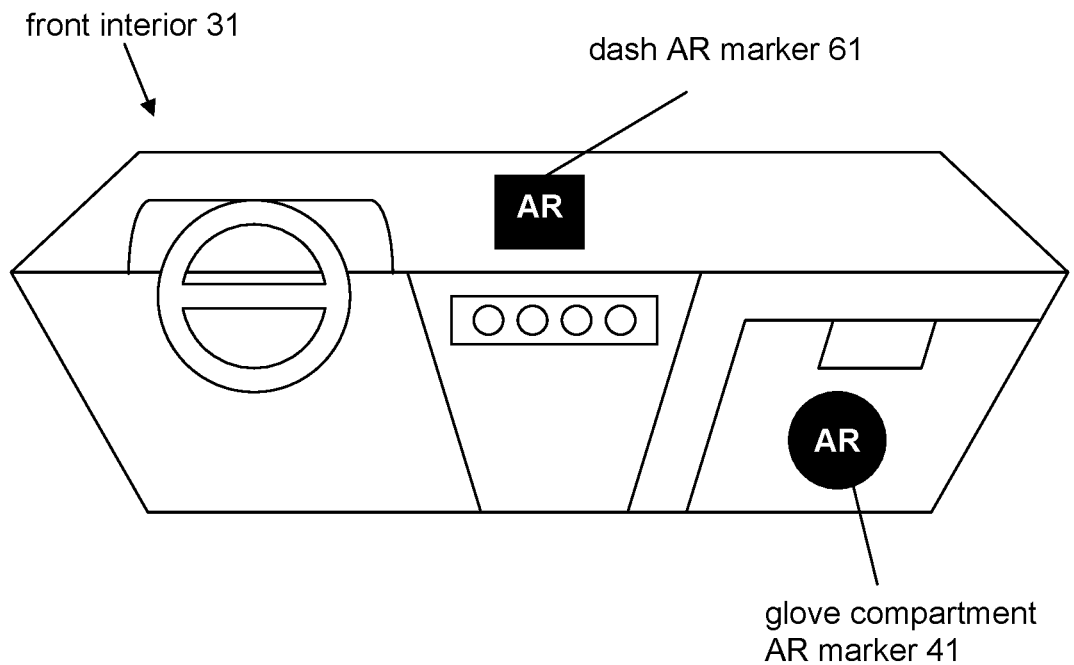
FIG. 6 illustrates AR markers placed on a dash and a glove compartment of an actual vehicle.

One or more user inputs may indicate which landmark will be detected by landmark component 21. For example, multiple landmarks may be within the field of view of image sensor 12. Landmark component 21 may choose one or more landmarks based on one or more user inputs received through one or more input devices. By way of non-limiting example, an augmented reality marker corresponding to a glove compartment of an actual vehicle and another augmented reality marker corresponding to a dash of the actual vehicle may be within the field of view of image sensor 12. For example, FIG. 6 illustrates front interior 31 of an actual vehicle. Front interior 31 includes glove compartment AR marker 41 and dash AR marker 61. Based on user inputs, landmark component 21 may choose one or both of glove compartment AR marker 41 and dash AR marker 61.

Landmark component 21 may be configured to determine a position and an orientation of a landmark. Landmark component 21 may determine a position and an orientation of the landmark based on output signals conveying visual information within the field of view of image sensor 12. As explained above, landmark component 21 may include or retrieve information (for example, a database, etc.) that matches the landmark to a position and an orientation of an actual vehicle component. Determining the position and the orientation of a landmark may facilitate determining the position and the orientation of an actual vehicle component.

In some implementations, landmark component 21 may be configured to change one or both of a determined position and/or a determined orientation of a landmark based on one or more user inputs received through one or more input devices. By way of non-limiting example, an input device may include one or more of a key entry device, a touch entry device, a sound device, and/or other input devices, as described above. A user input may refer to one or more information provided by a user through an input device, as described above. A user input may include one or more information relating to the position and/or the orientation of a landmark.

One or more user inputs may indicate changes to one or both of the determined position and/or the determined orientation of the landmark. For example, the determined position of the landmark may be moved and/or the determined orientation of the landmark may be rotated based on one or more user inputs received through one or more input devices. Such changes may be made to offset for any error in the determined position and/or the determined orientation of the landmark and/or based on a user preference.

For example, FIG. 7A illustrates a detection of a glove compartment landmark in accordance with one or more implementations. Landmark component 21 may detect the glove compartment and determine a position and an orientation of the glove compartment as shown by glove compartment detection 71 (dotted lines). As can be seen in FIG. 7A, the determined position and the determined orientation of the glove compartment contains errors in position (moved to the left) and orientation (rotated counter-clockwise).

Landmark component 21 may change glove compartment detection 71 based on one or more inputs received through one or more input devices. For example, FIG. 7B illustrates changes made to glove compartment detection 71, as shown by changed glove compartment detection 72. In FIG. 7B, glove compartment detection 71 has been changed to changed glove compartment detection 72 by landmark component 21 by moving the determined position to the right and rotating the determined orientation clockwise.

Virtual vehicle information component 22 may be configured to select a virtual vehicle component. Virtual vehicle information component 22 may select a virtual vehicle component based on one or more of a vehicle type, a landmark, an actual vehicle component, a prior selection of a virtual vehicle component, and/or other information relating to a virtual vehicle component. Virtual vehicle information component 22 may include or retrieve information (for example, a database, etc.) that matches one or more of a vehicle type, a landmark, an actual vehicle component and/or other information to a particular virtual vehicle component.

Figure 8A:
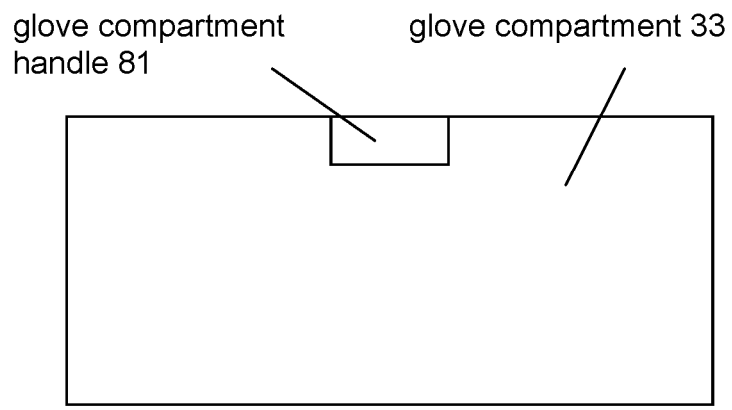
FIG. 8A illustrates a glove compartment of an actual vehicle.
Figure 8B:
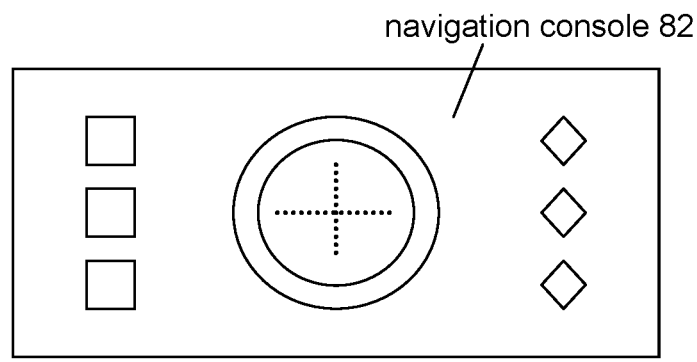
FIG. 8B illustrates a navigation console of a virtual vehicle placed over a glove compartment of an actual vehicle in accordance with one or more implementations.

For example, virtual vehicle information component 22 may match a particular landmark (for example, a glove compartment of a particular actual vehicle) to a particular virtual vehicle component (for example, a navigation console of an X-Wing). FIG. 8A illustrates a glove compartment 33 of an actual vehicle. Glove compartment 33 includes a glove compartment handle 81. Virtual vehicle information component 22 may match glove compartment 33 to navigation console 82, as shown in FIG. 8B. When navigation console 82 is overlaid on top of glove compartment 33, glove compartment handle 81 is not visible.

As another example, virtual vehicle information component 22 may select a virtual vehicle component based on a prior selection of a virtual vehicle component, such as a prior selection of a virtual vehicle component described below. As another example, virtual vehicle information component 22 may select a virtual vehicle component based one or more user inputs received through one or more input devices, as described below.

In some implementations, virtual vehicle information component 22 may be configured to change the selection of the virtual component based on one or more user inputs received through one or more input devices. By way of non-limiting example, an input device may include one or more of a key entry device, a touch entry device, a sound device, and/or other input devices, as described above. A user input may refer to one or more information provided by a user through an input device, as described above. A user input may include one or more information relating to a virtual vehicle component.

One or more user inputs may indicate changes to the selection of a virtual vehicle component. For example, virtual vehicle information component 22 may have selected a particular virtual vehicle based on one or more of a vehicle type, a landmark, an actual vehicle component, a prior selection of a virtual vehicle component, and/or other information relating to the virtual vehicle component. Virtual vehicle information component 22 may change the selection of the particular virtual vehicle based on one or more user inputs.

Figure 8C:
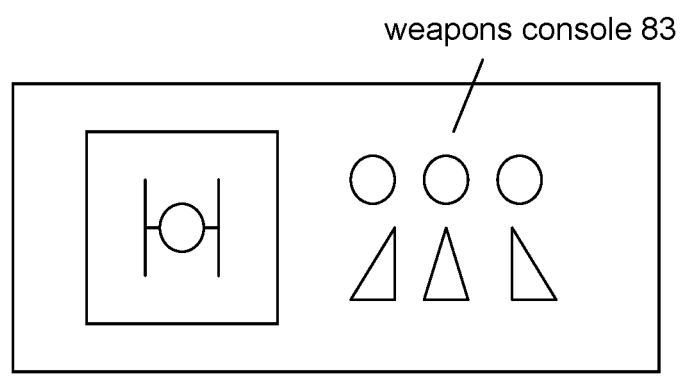
FIG. 8C illustrates a weapons console of a virtual vehicle placed over a glove compartment of an actual vehicle in accordance with one or more implementations.

For example, virtual vehicle information component 22 may have selected navigation console 82 of an X-Wing as the virtual vehicle component to be overlaid over glove compartment 33, as shown in FIGS. 8A and 8B. Virtual vehicle information component 22 may change, based on one or more user inputs, the selection of the virtual vehicle component to a weapons control of an X-Wing, as shown in FIG. 8C. In FIG. 8C, navigation console 82 has been replaced by weapons console 83 as the virtual vehicle component overlaying glove compartment 33. As another example, virtual vehicle information component 22 may change the selection of the virtual vehicle component to a virtual vehicle component of a different virtual vehicle (for example, a component of the Millennium Falcon).

In some implementations, virtual vehicle information component 22 may be configured to select a virtual vehicle component based on information remotely received from system 10. For example, system 10 may include a wireless communication device coupled to processor 11, and the wireless communication device may allow virtual vehicle information component 22 to receive information relating to a virtual vehicle component from another actual vehicle. For example, virtual vehicle information component 22 operating inside a first actual vehicle may remotely receive information relating to a virtual vehicle component from a second actual vehicle beside the first actual vehicle. The information relating to the virtual vehicle component may instruct virtual vehicle information component 22 to select a particular virtual vehicle component to augment the exterior of the second actual vehicle. Such a selection of a virtual vehicle component may allow individuals to determine how their individual actual vehicles may appear to be augmented to other individuals.

Figure 9A:
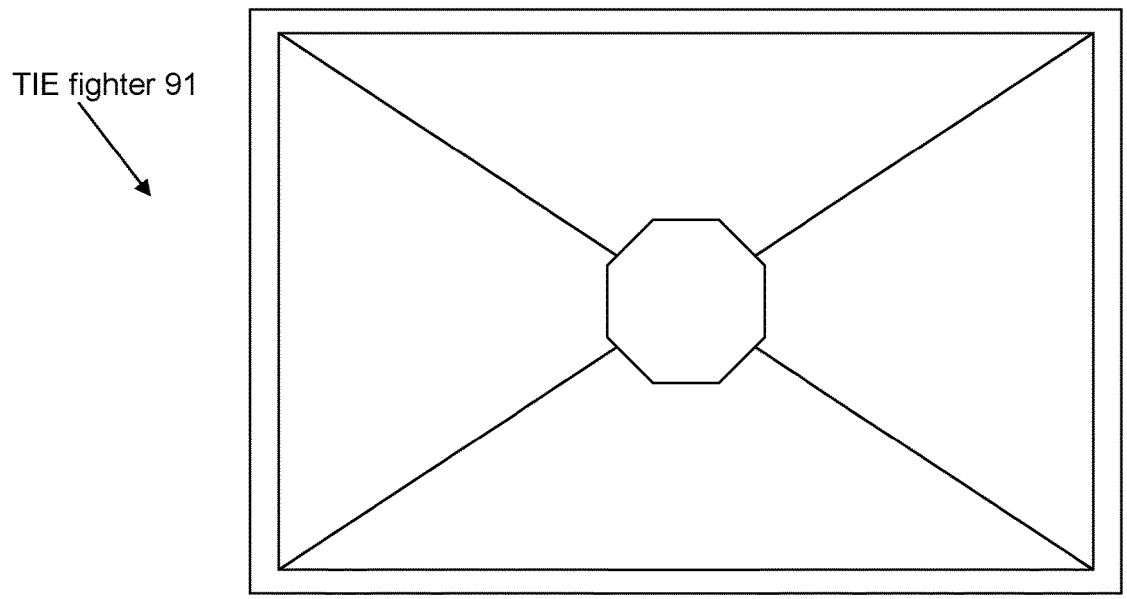
FIG. 9A illustrates a TIE fighter placed over an exterior of an actual vehicle in accordance with one or more implementations.
Figure 9B:
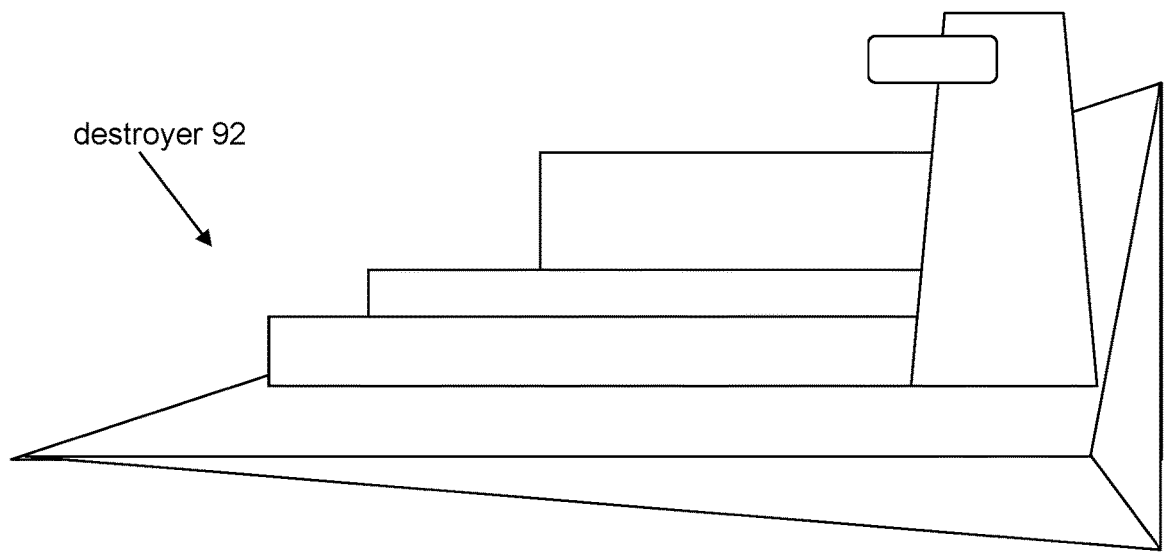
FIG. 9B illustrates a destroyer placed over an exterior of an actual vehicle in accordance with one or more implementations.

For example, exterior 51 of an actual vehicle, as shown in FIG. 5, may be the actual vehicle component to be augmented. Virtual vehicle information component 22 may select TIE fighter 91, as shown in FIG. 9A, as the virtual vehicle component to be overlaid over exterior 51. In some implementations, virtual vehicle information component 22 may remotely receive information relating to the virtual vehicle component from the actual vehicle. The virtual vehicle information remotely received may indicate that an individual inside the actual vehicle would like exterior 51 of the actual vehicle to be overlaid with destroyer 92, as shown in FIG. 9B. Virtual vehicle information component 22 may select destroyer 92 if virtual vehicle information component 22 is configured to select the virtual vehicle component based on information remotely received from system 10.

Virtual vehicle information component 22 may be configured to determine a position and an orientation of the virtual vehicle component based on the determined position and the determined orientation of the landmark. Virtual vehicle information component 22 may include or retrieve information (for example, a database, etc.) that matches a position and an orientation of a virtual vehicle component relative to the determined position and the determined orientation of the landmark. For example, virtual vehicle information component 22 may determine the position of an virtual vehicle component based on the determined position of a landmark (which may facilitate determination of the position of an actual vehicle component), and the orientation of the virtual vehicle component based on the determined orientation of the landmark (which may facilitate determination of the orientation of an actual vehicle component).

In some implementations, virtual vehicle information component 22 may be configured to change one or both of the determined position and/or the determined orientation of the virtual vehicle component based on one or more user inputs received through one or more input devices. By way of non-limiting example, an input device may include one or more of a key entry device, a touch entry device, a sound device, and/or other input devices, as described above. A user input may refer to one or more information provided by a user through an input device, as described above. A user input may include one or more information relating to the position and/or the orientation of a virtual vehicle.

One or more user inputs may indicate changes to one or both of the determined position and/or the determined orientation of the virtual vehicle component. For example, the determined position of the virtual vehicle component may be moved and/or the determined orientation of the virtual vehicle component may be rotated based on one or more user inputs received through one or more input devices. Such changes may be made to offset for any error in the determined position and/or the determined orientation of the landmark (which may lead to errors in determining position and/or orientation of the virtual vehicle component) and/or based on a user preference.

Figure 10A:
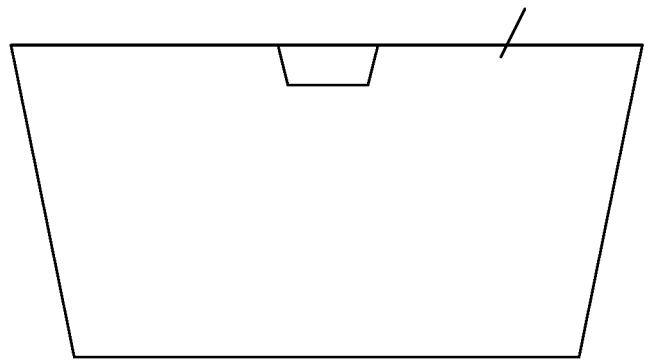
FIG. 10A illustrates a glove compartment of an actual vehicle.
Figure 10B:
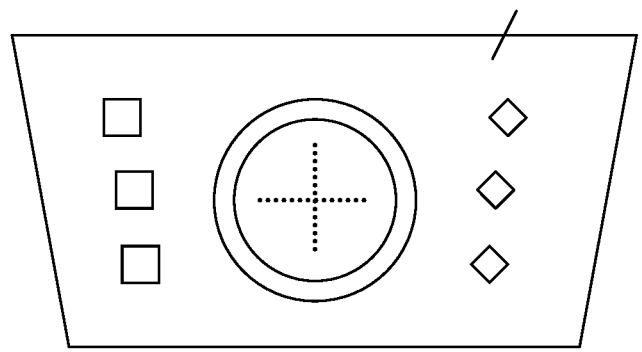
FIG. 10B illustrates a navigation console of a virtual vehicle placed over a glove compartment of an actual vehicle in accordance with one or more implementations.

For example, FIG. 10A illustrates glove compartment 101 of an actual vehicle to be augmented by a navigation console of an X-Wing. As shown in FIG. 10A, the bottom portion of glove compartment 101 tilts away from image sensor 12. Virtual vehicle information component 22 may determine the position and the orientation of the navigation console to match the position and the orientation of glove compartment 101, as shown by original navigation console 102 in FIG. 10B. The bottom portion of original navigation console 102 appears to tilt away like glove compartment 101.

Figure 10C:
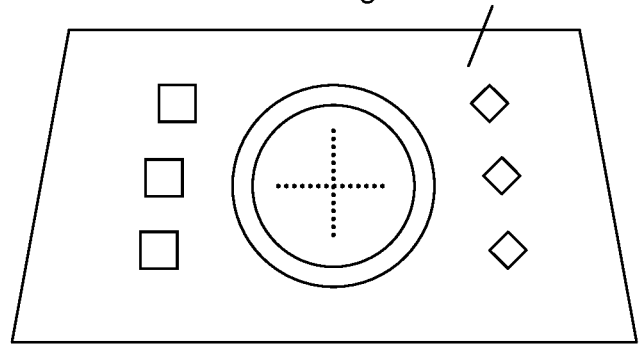
FIG. 10C illustrates a tilted navigation console of a virtual vehicle placed over a glove compartment of an actual vehicle in accordance with one or more implementations.

Virtual vehicle information component 22 may change the position and/or the orientation of the navigation console based on one or more inputs received through one or more input devices. For example, FIG. 10C illustrates changes made to the orientation of the navigation console, as shown by tilted navigation console 103. In FIG. 10C, the orientation of original navigation console 102 has been changed by tilting the bottom portion of the navigation forward, so that the bottom portion of the navigation console appears to tilt towards image sensor 12.

Overlay component 23 may be configured to determine an overlay image. The overlay image may include a virtual vehicle component determined by virtual vehicle information component 22. The virtual vehicle component may be placed within the overlay image according to the determined position and the determined orientation of the virtual vehicle component. The determined position and the determined orientation of the virtual vehicle component may change how the virtual vehicle component appears within the overlay image. For example, the determined position and the determined orientation of the virtual vehicle component may change one or more of the position, the size, the shape, the tilt, the rotation, and/or other appearances of the virtual vehicle component.

Display component 24 may be configured to effectuate displaying of an overlay image on display 13. The displaying may be effectuated so that one or more portions of the virtual vehicle component may appear to cover one or more portions of the actual vehicle component and augment the appearance of the actual vehicle component. In some implementations, display component 24 may be configured to effectuate displaying of an overlay image within one or more of an image, a video, and/or other visual information based on the output signals generated by image sensor 12.

In some implementations, display component 24 may be configured to effectuate displaying of an overlay image on display 13, which allows light to be passed through display 13 in portions in which the overlay image does not contain a virtual vehicle component. For example, display 13 may include one or more of an optical head-mounted display and a user of display 13 may see light from the real world as well as the overlay image. In some implementations, display component 24 may be configured to change the transparency of one or more portions of display 13. For example, display component 24 may change the transparency of one or more portions of display 13 corresponding to one or more portions of a virtual vehicle component to block light from the real world passing through display 13

Figure 11:
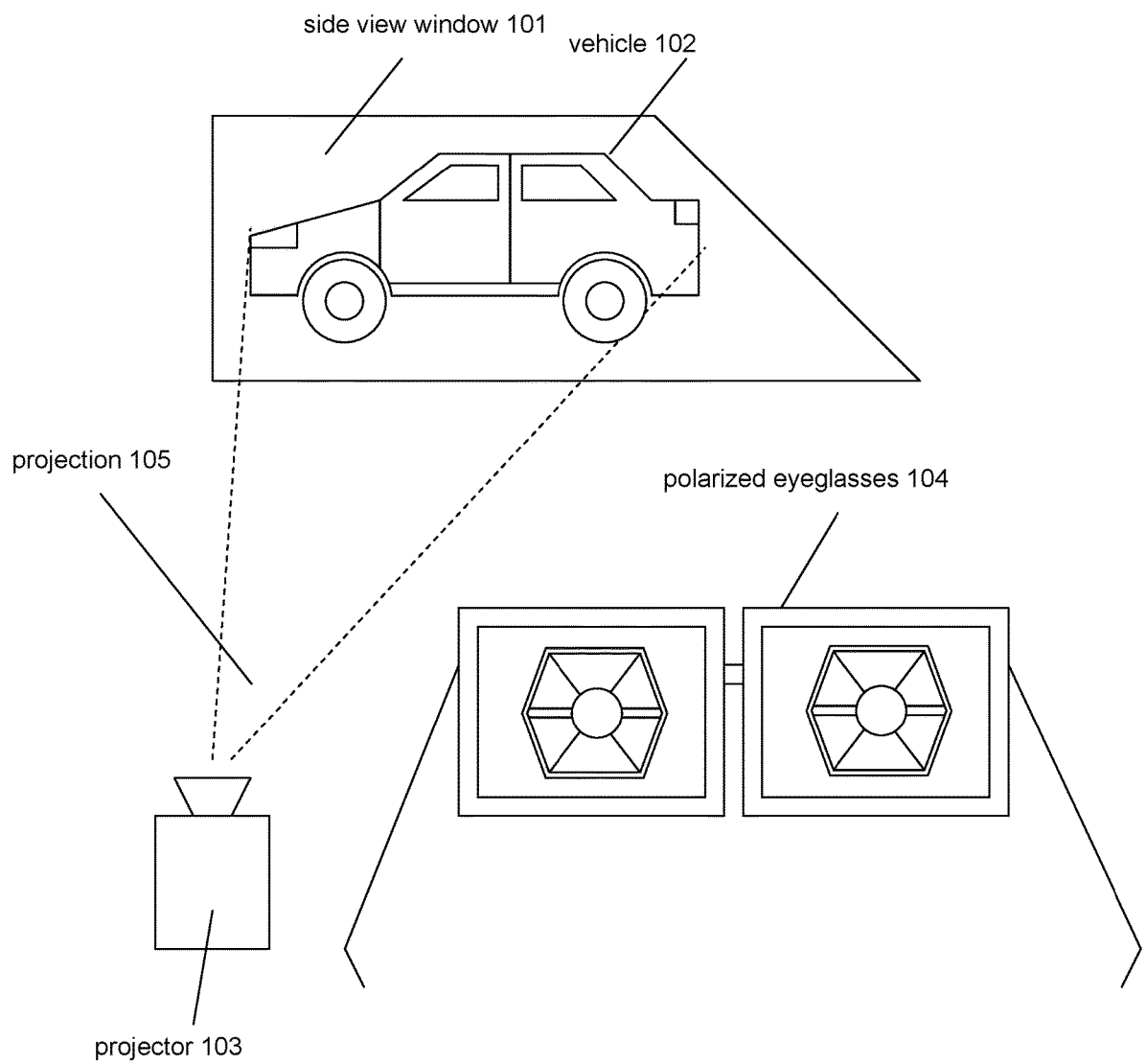
FIG. 11 illustrates the use of a projector and a polarized eyeglasses to display a TIE fighter placed over an exterior of an actual vehicle in accordance with one or more implementations.

In some implementations, display component 24 may be configured to effectuate displaying of an overlay image on display 13, which may include one or more of polarized eyeglasses and another display. For example, display 13 may include a pair of polarized eyeglasses and a projector. Display component 24 may be configured to effectuate displaying of an overlay image by using the projector to display one or more overlay images on a side window using polarized light. The overlay image may be viewed through the polarized eyeglasses. For example, FIG. 11 illustrates a use of projector 103, side view window 101, and polarized eyeglasses 104 to augment the appearance of vehicle 102. Projector 103 may direct projection 105 including a polarized overlay image on the surface of side view window 101. The polarized overlay image may include a TIE fighter to be overlaid on top of vehicle 102. When a person looks at vehicle 102 through side view window 101 without using polarized eyeglasses 104, the person sees vehicle 102. When a person looks at vehicle 102 through side view window 101 using polarized eyeglasses 104, the person sees the TIE fighter.

Although processor 11, image sensor 12, display 13, and electronic storage 14 are shown to be connected to a bus 15 in FIG. 1, any communication medium may be used to facilitate interaction between any components of system 10. One or more components of system 10 may communicate with each other through hard-wired communication, wireless communication, or both. For example, processor 11 may wirelessly communicate with image sensor 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 may be configured to execute one or more of actual vehicle information component 20, landmark component 21, virtual vehicle information component 22, overlay component 23, display component 24, and/or other components by software; hardware; firmware; some combination of software, hardware, and/or firmware; and/or other mechanisms for configuring processing capabilities on processor 11.

It should be appreciated that although actual vehicle information component 20, landmark component 21, virtual vehicle information component 22, overlay component 23, and display component 24 are illustrated in FIG. 1 as being co-located within a single processing unit, in implementations in which processor 11 comprises multiple processing units, one or more of actual vehicle information component 20, landmark component 21, virtual vehicle information component 22, overlay component 23, and/or display component 24 may be located remotely from the other computer program components.

The description of the functionality provided by the different computer program components 20, 21, 22, 23, and/or 24 described herein is for illustrative purposes, and is not intended to be limiting, as any of computer program components 20, 21, 22, 23, and/or 24 may provide more or less functionality than is described. For example, one or more of computer program components 20, 21, 22, 23, and/or 24 may be eliminated, and some or all of its functionality may be provided by other computer program components 20, 21, 22, 23, and/or 24. As another example, processor 11 may be configured to execute one or more additional computer program components that may perform some or all of the functionality attributed to one or more of computer program components 20, 21, 22, 23, and/or 24.

Although image sensor 12 is depicted in FIG. 1 as a single element, this is not intended to be limiting. Image sensor 12 may include one or more image sensors in one or more locations.

Although display 13 is depicted in FIG. 1 as a single element, this is not intended to be limiting. Display 13 may include one or more displays in one or more locations.

The electronic storage media of electronic storage 14 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 14 may be a separate component within system 10, or electronic storage 14 may be provided integrally with one or more other components of system 10 (e.g., processor 11). Although electronic storage 14 is shown in FIG. 1 as a single entity, this is for illustrative purposes only. In some implementations, electronic storage 14 may comprise a plurality of storage units. These storage units may be physically located within the same device, or electronic storage 14 may represent storage functionality of a plurality of devices operating in coordination.

Figure 2:
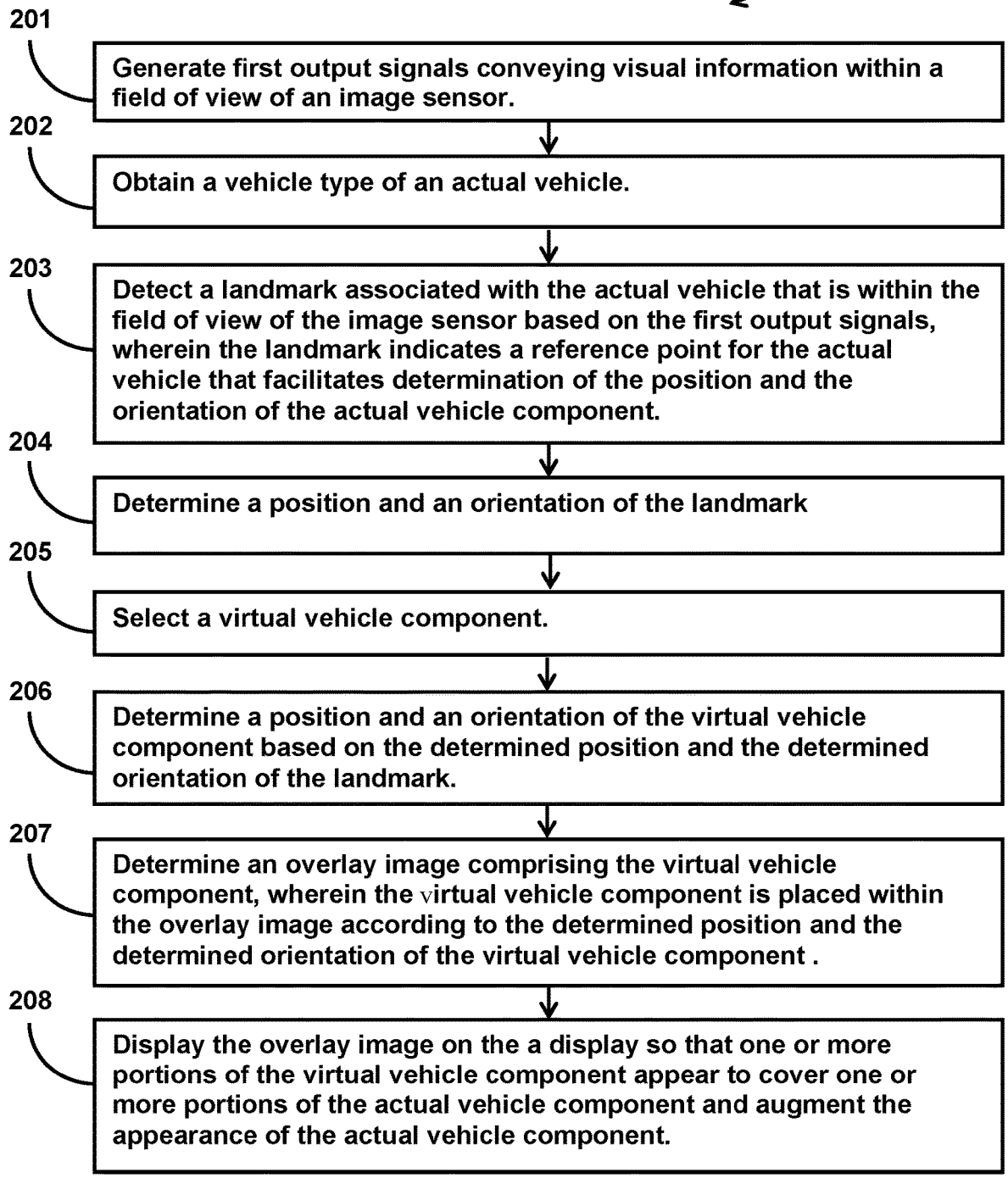
FIG. 2 illustrates a method to augment an appearance of an actual vehicle component of an actual vehicle with a virtual vehicle component.

FIG. 2 illustrates method 200 for augmenting an appearance of an actual vehicle component with a virtual vehicle component. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, first output signals conveying visual information within a field of view of an image sensor may be generated. Visual information may include one or more of an image, a video, and/or other visual information. In some implementations, operation 201 may be performed by one or more sensors the same as or similar to image sensor 12 (shown in FIG. 1 and described herein).

At operation 202, a vehicle type of the actual vehicle may be obtained. A vehicle type may include a make, a model, a year, shape, size, color, and/or other vehicle types. In some implementations, operation 202 may be performed by a processor component the same as or similar to actual vehicle information component 20 (shown in FIG. 1 and described herein).

At operation 203, a landmark associated with the actual vehicle that is within the field of view of the image sensor may be detected. The landmark may be detected based on the first output signals. The landmark may indicate a reference point for the actual vehicle that facilitates determination of the position and the orientation of the actual vehicle component. In some implementations, operation 203 may be performed by a processor component the same as or similar to landmark component 21 (shown in FIG. 1 and described herein).

At operation 204, a position and an orientation of the landmark may be determined. In some implementations, operation 204 may be performed by a processor component the same as or similar to landmark component 21 (shown in FIG. 1 and described herein).

At operation 205, a virtual vehicle component may be selected. In some implementations, operation 205 may be performed by a processor component the same as or similar to virtual vehicle information component 22 (shown in FIG. 1 and described herein).

At operation 206, a position and an orientation of the virtual vehicle component may be determined based on the determined position and the determined orientation of the landmark. In some implementations, operation 206 may be performed by a processor component the same as or similar to virtual vehicle information component 22 (shown in FIG. 1 and described herein).

At operation 207, an overlay image comprising the virtual vehicle component may be determined. The virtual vehicle component may be placed within the overly image according to the determined position and the determined orientation of the virtual vehicle component. In some implementations, operation 207 may be performed by a processor component the same as or similar to overlay component 23 (shown in FIG. 1 and described herein).

At operation 208, the overlay image may be displayed on a display so that one or more portions of the virtual vehicle component appear to cover one or more portions of the actual vehicle component and augment the appearance of the actual vehicle component. In some implementations, operation 208 may be performed by a processor component the same as or similar to display component 24 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for augmenting an appearance of an actual vehicle component of an actual vehicle with a virtual vehicle component, the system comprising:
   an image sensor configured to generate output signals conveying visual information within a field of view of the image sensor;
   a display configured to display an overlay image; and
   one or more processors configured by machine readable instructions to:
      obtain a vehicle type of the actual vehicle and determine a structural composition of the actual vehicle based on the vehicle type of the actual vehicle;
      detect presence of the actual vehicle component within the actual vehicle within the field of view of the image sensor based on the output signals, and determine a position, a tilt, and a rotation of the actual vehicle component within the actual vehicle;
      select the virtual vehicle component based on the vehicle type and the actual vehicle component, the virtual vehicle component including one or more parts of a virtual vehicle conforming to the structural composition of the actual vehicle component of the actual vehicle, the virtual vehicle being of a second vehicle type that is different from the vehicle type of the actual vehicle;

determine a position of the virtual vehicle component based on the determined position of the actual vehicle component, a tilt of the virtual vehicle component based on the determined tilt of the actual vehicle component, and a rotation of the virtual vehicle component based on the determined rotation of the actual vehicle component;

determine the overlay image comprising the virtual vehicle component, wherein the virtual vehicle component:
  is placed within the overlay image according to the determined position of the virtual vehicle component,
  is tilted within the overlay image according to the determined tilt of the virtual vehicle component,
  is rotated within the overlay image according to the determined rotation of the virtual vehicle component, and
  has a virtual composition the conforms to the structural composition of the actual vehicle component of the actual vehicle; and effectuate displaying of the overlay image on the display such that the virtual vehicle component covers the actual vehicle component and augments the appearance of the actual vehicle component such that a user is caused to perceive the virtual vehicle component and not the actual vehicle component.

2. The system of claim 1, wherein the actual vehicle component includes one or more of an interior of the actual vehicle, an exterior of the actual vehicle, a seat, a headrest, a dash, a dashboard, a steering wheel, a gearstick, a gear knob, a glove compartment, a floorpan, a mat, an air vent, a navigation system, an entertainment system, a ceiling, an interior light, a moon roof, a tilt roof, a windshield, a side window, a rear window, a rear view mirror, a side view mirror, an arm rest, a front center console, a rear center console, a logo, a door, a door handle, a hood, a grille, a bumper, a fender, a headlight, a tail light, a wheel, a hubcap, a trunk lid, a tailgate, a roof, a side panel, or a trailer.

3. The system of claim 1, wherein a different virtual vehicle component is selected for the actual vehicle component based on different vehicle types of the actual vehicle such that:
  a first virtual vehicle component is selected for the actual vehicle component based on the actual vehicle being of a first vehicle type; and
  a second virtual vehicle component is selected for the actual vehicle component based on the actual vehicle being of a second vehicle type, the first virtual vehicle component being different from the second virtual vehicle component.

4. The system of claim 1, wherein the display comprises one or more of a head-mounted display, an optical head-mounted display, a see-through display, an optical see-through display, a video see-through display, a visor, eyeglasses, sunglasses, a smartphone, a tablet, a mobile device, or a projector.

5. The system of claim 1, wherein the image sensor and the one or more processors are mounted on the display, and wherein the field of view of the image sensor is a function of a position, a tilt, and a rotation of the display.

6. The system of claim 1, wherein the one or more processors are further configured to change the selection of the virtual component based on a user input received through an input device.

7. The system of claim 1, wherein the one or more processors are further configured to change one or more of the determined position, the determined tilt, or the determined rotation of the virtual vehicle component based on a user input received through an input device.

8. The system of claim 1, wherein the one or more processors are further configured to change the detection of the actual vehicle component based on a user input received through an input device.

9. The system of claim 1, wherein the one or more processors are further configured to change one or more of the determined position of the actual vehicle component, the determined tilt of the actual vehicle component, or the determined rotation of the actual vehicle component based on a user input received through an input device.

10. A method for augmenting an appearance of an actual vehicle component of an actual vehicle with a virtual vehicle component, the method comprising:
  generating output signals conveying visual information within a field of view of an image sensor;
  obtaining a vehicle type of the actual vehicle and determining a structural composition of the actual vehicle based on the vehicle type of the actual vehicle;
  detecting presence of the actual vehicle component within the actual vehicle within the field of view of the image sensor based on the output signals, and determining a position, a tilt, and a rotation of the actual vehicle component within the actual vehicle;
  selecting the virtual vehicle component based on the vehicle type and the actual vehicle component, the virtual vehicle component including one or more parts of a virtual vehicle conforming to the structural composition of the actual vehicle component of the actual vehicle, the virtual vehicle being of a second vehicle type that is different from the vehicle type of the actual vehicle;
  determining a position of the virtual vehicle component based on the determined position of the actual vehicle component, a tilt of the virtual vehicle component based on the determined tilt of the actual vehicle component, and a rotation of the virtual vehicle component based on the determined rotation of the actual vehicle component;
  determining an overlay image comprising the virtual vehicle component, wherein the virtual vehicle component:
    is placed within the overlay image according to the determined position of the virtual vehicle component,
    is tilted within the overlay image according to the determined tilt of the virtual vehicle component,
    is rotated within the overlay image according to the determined rotation of the virtual vehicle component, and
    has a virtual composition the conforms to the structural composition of the actual vehicle component of the actual vehicle; and
  effectuating displaying of the overlay image on a display such that the virtual vehicle component covers the actual vehicle component and augments the appearance of the actual vehicle component such that a user is caused to perceive the virtual vehicle component and not the actual vehicle component.

11. The method of claim 10, wherein the actual vehicle component includes one or more of an interior of the actual vehicle, an exterior of the actual vehicle, a seat, a headrest, a dash, a dashboard, a steering wheel, a gearstick, a gear knob, a glove compartment, a floorpan, a mat, an air vent, a navigation system, an entertainment system, a ceiling, an interior light, a moon roof, a tilt roof, a windshield, a side window, a rear window, a rear view mirror, a side view mirror, an arm rest, a front center console, a rear center console, a logo, a door, a door handle, a hood, a grille, a bumper, a fender, a headlight, a tail light, a wheel, a hubcap, a trunk lid, a tailgate, a roof, a side panel, or a trailer.

12. The method of claim 10, wherein a different virtual vehicle component is selected for the actual vehicle component based on different vehicle types of the actual vehicle such that:
   a first virtual vehicle component is selected for the actual vehicle component based on the actual vehicle being of a first vehicle type; and
   a second virtual vehicle component is selected for the actual vehicle component based on the actual vehicle being of a second vehicle type, the first virtual vehicle component being different from the second virtual vehicle component.

13. The method of claim 10, wherein the display comprises one or more of a head-mounted display, an optical head-mounted display, a see-through display, an optical see-through display, a video see-through display, a visor, eyeglasses, sunglasses, a smartphone, a tablet, a mobile device, or a projector.

14. The method of claim 10, wherein the image sensor is mounted on the display, and wherein the field of view of the image sensor is a function of a position, a tilt, and a rotation of the display.

15. The method of claim 10, further comprising changing the selection of the virtual component based on a user input received through an input device.

16. The method of claim 10, further comprising changing one or more of the determined position, the determined tilt, or the determined rotation of the virtual vehicle component based on a user input received through an input device.

17. The method of claim 10, further comprising changing the detection of the actual vehicle component based on a user input received through an input device.

18. The method of claim 10, further comprising changing one or more of the determined position of the actual vehicle component, the determined tilt of the actual vehicle component, or the determined rotation of the actual vehicle component based on a user input received through an input device.

19. A system for augmenting an appearance of an actual vehicle component of an actual vehicle with a virtual vehicle component, the system comprising:
   an image sensor configured to generate output signals conveying visual information within a field of view of the image sensor;
   a display configured to display an overlay image;
      wherein the image sensor is mounted on the display, and
   wherein the field of view of the image sensor is a function of a position and an orientation of the display; and
   one or more processors configured by machine readable instructions to:
      obtain a vehicle type of the actual vehicle and determine a structural composition of the actual vehicle based on the vehicle type of the actual vehicle;
      detect presence of the actual vehicle component within the actual vehicle within the field of view of the image sensor based on the output signals, and determine a position, a tilt, and a rotation of the actual vehicle component within the actual vehicle;
      select the virtual vehicle component based on the vehicle type and the actual vehicle component, the virtual vehicle component including one or more parts of a virtual vehicle conforming to the structural composition of the actual vehicle component of the actual vehicle, the virtual vehicle being of a second vehicle type that is different from the vehicle type of the actual vehicle;
      change the selection of the virtual component based on a user input received through an input device;
      determine a position of the virtual vehicle component based on the determined position of the actual vehicle component, a tilt of the virtual vehicle component based on the determined tilt of the actual vehicle component, and a rotation of the virtual vehicle component based on the determined rotation of the actual vehicle component;
      determine the overlay image comprising the virtual vehicle component, wherein the virtual vehicle component:
         is placed within the overlay image according to the determined position of the virtual vehicle component,
         is tilted within the overlay image according to the determined tilt of the virtual vehicle component,
         is rotated within the overlay image according to the determined rotation of the virtual vehicle component, and
         has a virtual composition the conforms to the structural composition of the actual vehicle component of the actual vehicle; and
      effectuate displaying of the overlay image on the display such that the virtual vehicle component covers the actual vehicle component and augments the appearance of the actual vehicle component such that a user is caused to perceive the virtual vehicle component and not the actual vehicle component.

20. The system of claim 19, wherein the display comprises one or more of a head-mounted display, an optical head-mounted display, a see-through display, an optical see-through display, a video see-through display, a visor, eyeglasses, sunglasses, a smartphone, a tablet, a mobile device, or a projector.

21. The system of claim 1, wherein the virtual vehicle component is a different vehicle component than the actual vehicle component.

22. The method of claim 10, wherein the virtual vehicle component is a different vehicle component than the actual vehicle component.

23. The system of claim 19, wherein the virtual vehicle component is a different vehicle component than the actual vehicle component.

* * * * *